(12) United States Patent
Chen

(10) Patent No.: US 8,186,718 B2
(45) Date of Patent: May 29, 2012

(54) TUBULAR CONNECTION STRUCTURE

(76) Inventor: Tsan-Jee Chen, Taipei (TW)

( * ) Notice: Subject to any disclaimer, the term of this patent is extended or adjusted under 35 U.S.C. 154(b) by 35 days.

(21) Appl. No.: 12/859,355

(22) Filed: Aug. 19, 2010

(65) Prior Publication Data
US 2012/0043753 A1    Feb. 23, 2012

(51) Int. Cl.
*F16L 17/00* (2006.01)
(52) U.S. Cl. ............... 285/87; 285/85; 285/312
(58) Field of Classification Search ............... 285/83, 285/312, 82, 85, 88
See application file for complete search history.

(56) References Cited

U.S. PATENT DOCUMENTS

| | | | | |
|---|---|---|---|---|
| 450,373 | A * | 4/1891 | Ott | 285/85 |
| 3,084,713 | A * | 4/1963 | Parrish | 137/583 |
| 3,124,374 | A * | 3/1964 | Krapp | 285/85 |
| 3,383,123 | A * | 5/1968 | Murray | 285/83 |
| 3,439,942 | A * | 4/1969 | Moore et al. | 285/80 |
| 4,222,593 | A * | 9/1980 | Lauffenburger | 285/85 |
| 4,295,670 | A * | 10/1981 | Goodall et al. | 285/91 |
| 4,426,063 | A * | 1/1984 | Bormioli | 251/149.9 |
| 5,005,876 | A * | 4/1991 | Fahl | 285/311 |
| 5,435,604 | A * | 7/1995 | Chen | 285/84 |
| 5,816,623 | A * | 10/1998 | Chang | 285/88 |
| 5,904,380 | A * | 5/1999 | Lee | 285/312 |
| 5,911,444 | A * | 6/1999 | Buchter et al. | 285/69 |
| 5,988,693 | A * | 11/1999 | Street | 285/80 |
| 6,015,168 | A * | 1/2000 | Fahl | 285/81 |
| 6,047,995 | A * | 4/2000 | Kotake | 285/85 |
| 6,053,540 | A * | 4/2000 | Meyer | 285/88 |
| 6,089,619 | A * | 7/2000 | Goda | 285/312 |
| 6,224,113 | B1 * | 5/2001 | Chien | 285/85 |
| 6,371,523 | B1 * | 4/2002 | Chen | 285/84 |
| 6,412,827 | B1 * | 7/2002 | Barclay et al. | 285/312 |
| 6,447,016 | B2 * | 9/2002 | Collier | 285/81 |
| 6,543,812 | B1 * | 4/2003 | Chang | 285/81 |
| 2001/0045745 | A1 * | 11/2001 | Collier | 285/81 |
| 2010/0072745 | A1 * | 3/2010 | Dixon | 285/88 |
| 2011/0260444 | A1 * | 10/2011 | Lee | 285/85 |

\* cited by examiner

*Primary Examiner* — Aaron Dunwoody
(74) *Attorney, Agent, or Firm* — Ming Chow; Sinorica, LLC

(57) ABSTRACT

A tubular connection structure having a tubular connection body, having a tubular space, each of the two sides of which has an open slot extended to form a pivotal base, the bottom of the tubular connection body extended to form a fastening base; a clasp lever pivotally connected to the pivotal bases, one end being a pressing portion, the other end being a stirring portion having a stirring lever accommodating base; a stirring lever accommodated in the stirring lever accommodating base, the top of the stirring lever being a stop convex portion configured to fasten the fastening base; a reset component one end of the reset component urged towards the stirring lever, the other end being urged towards the clasp lever; and at least two fixing members, connected to the clasp lever and the pivotal bases and connected to the stirring lever and the stirring lever accommodating base.

9 Claims, 6 Drawing Sheets

TUBULAR CONNECTION STRUCTURE

BACKGROUND OF THE INVENTION

1. Field of the Invention

The present invention generally relates to a tubular connection structure, more particularly, to a tubular connection structure that is to closely fasten tubes and a tubular connection body and prevent a clasp lever of the tubular connection structure to be easily loosened up.

2. Description of the Prior Art

For a prior tubular connector, which has a joining axle hole, at least one side of the tubular connector is selected to have at least one open and at least one pivotal portion so as to make a pivotal connection for a fastening handle. By swinging the fastening handle, a convex portion of the front end of the fastening handle may urge onto a male connector or a ring-type concave wall in order to have the functions of connecting tubes or close. As it can be seen, the convex portion of the front end of the fastening handle is the only way to have the function of stop and short of a security device for preventing that the tubular connector is loosened up. So the conditions of vibrations, external forces, other man-made factors, etc. may loosen up or take off the two connected tubular connectors, the liquid inside the connectors may overflow to contaminate environment and damage human beings.

Hence, how to develop a product for figuring out the disadvantages of the prior art may be an important issue to the people skilled in the art.

SUMMARY OF THE INVENTION

The main objective of the present invention is to provide a tubular connection structure, which adopts the cooperation of a clasp lever and a stirring lever to closely fasten tubes and a tubular connection body and prevent a clasp lever of the tubular connection structure to be easily loosened up.

To achieve the objective, the present invention comprises: a tubular connection body, which has a tubular room, each of the two sides of which has an open slot, the two sides of the open slot are respectively extended to form two pivotal bases, which are corresponding to each other, a room is between the two pivotal bases, each of the two pivotal bases has a pivotal hole, the bottom of the tubular connection body being extended to form a fastening base, which has a stop room, a guiding surface is at the one side of the stop room;
a clasp lever, the one end of the clasp lever is a pressing portion, the other end of the clasp lever is a stirring portion that has a stirring lever accommodating base;
a stirring lever, which is accommodated in the stirring lever accommodating base, the stirring lever accommodating base of the clasp lever has a pivotal hole, a through hole of the stirring lever is corresponding to the pivotal hole, the top of the stirring lever is a stop convex portion, which has a positioning surface in line with the guiding surface;
a reset component, the one end of the reset component being urged to the stirring lever, the other end being urged to the clasp lever, so that a flexible resistant force is between the stirring lever and the clasp lever;
a ring, which is through a hole of the stirring lever for a user stirring the stirring lever;
at least two fixing members, the one end of each of the fixing member has a screw head, the fixing members are provided to have the pivotal connections of the clasp lever with the pivotal base of the tubular connection body and the stirring lever with the stirring lever accommodating base of the clasp lever through the screw heads, the pivotal hole and the pivotal hole.

While the clasp lever moves toward the tubular connection body, the positioning surface of the stirring lever contacts the guiding surface of the fastening base, the stop convex portion may be easily slid into the stop room of the fastening base. By means of the stop convex portion and the stop portion of the fastening base, the clasp lever may not be loosened up. In the mean time, the pressing portion of the clasp lever is pressed toward the tubular room for fastening the tubes.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1:
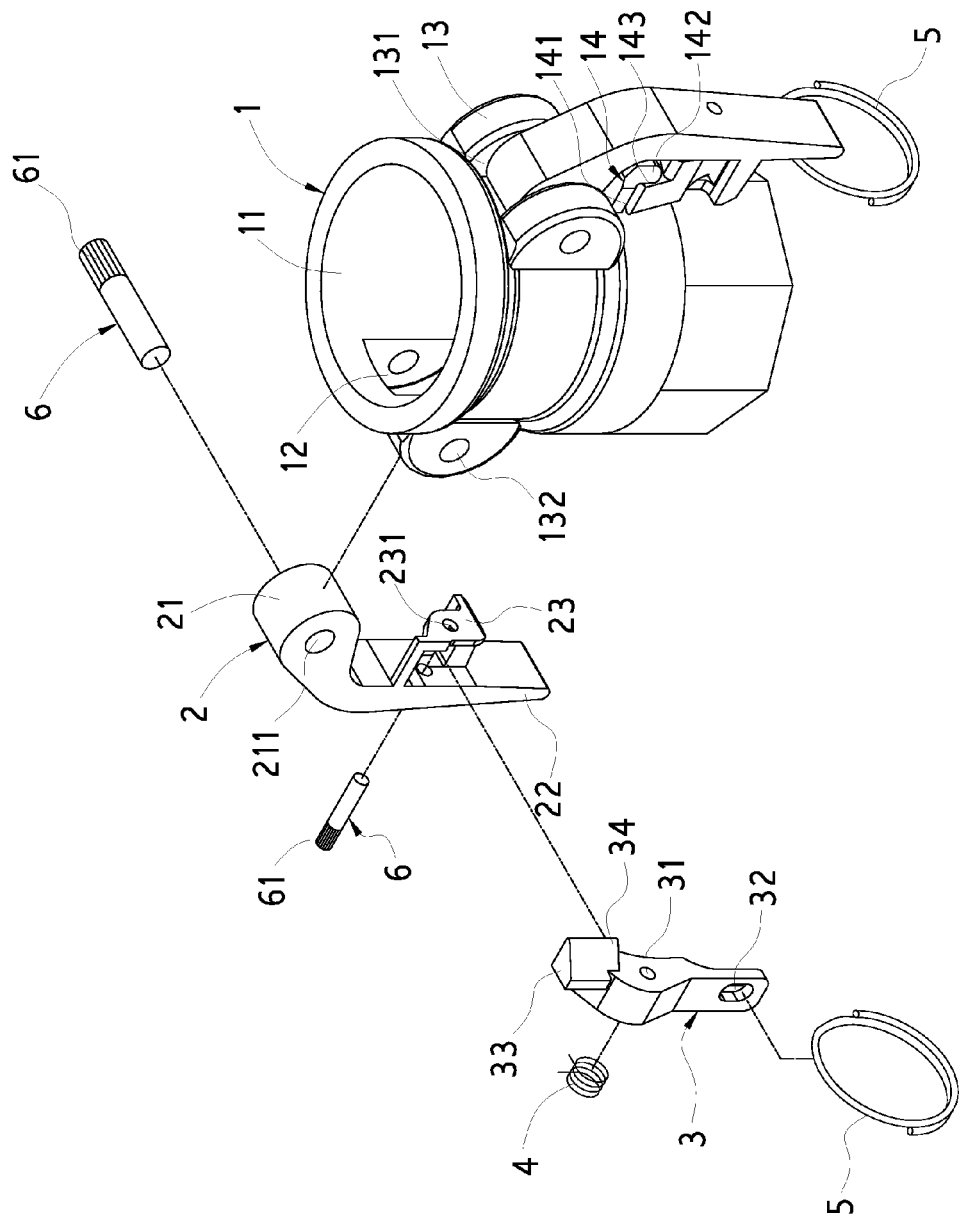
FIG. 1 illustrates a schematic 3-D exploded view of the tubular connection structure of the present invention.
Figure 2:
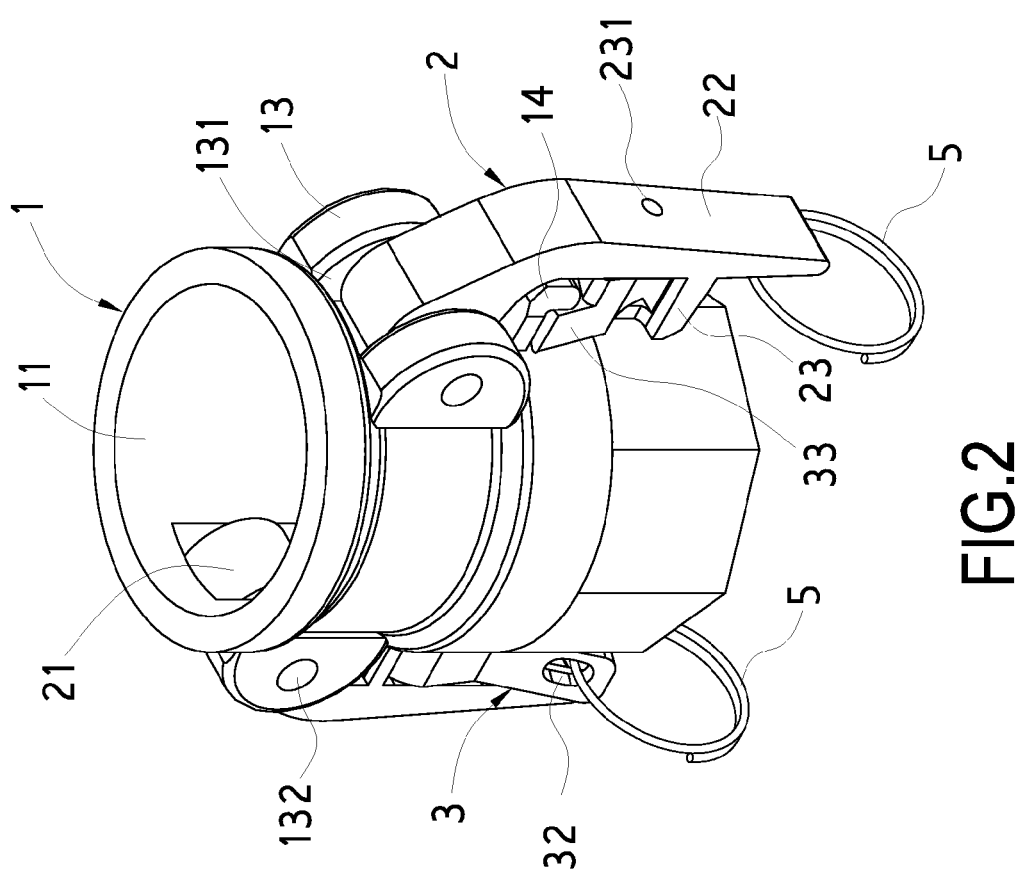
FIG. 2 illustrates a schematic 3-D assembled view of the tubular connection structure of the present invention.
Figure 3:
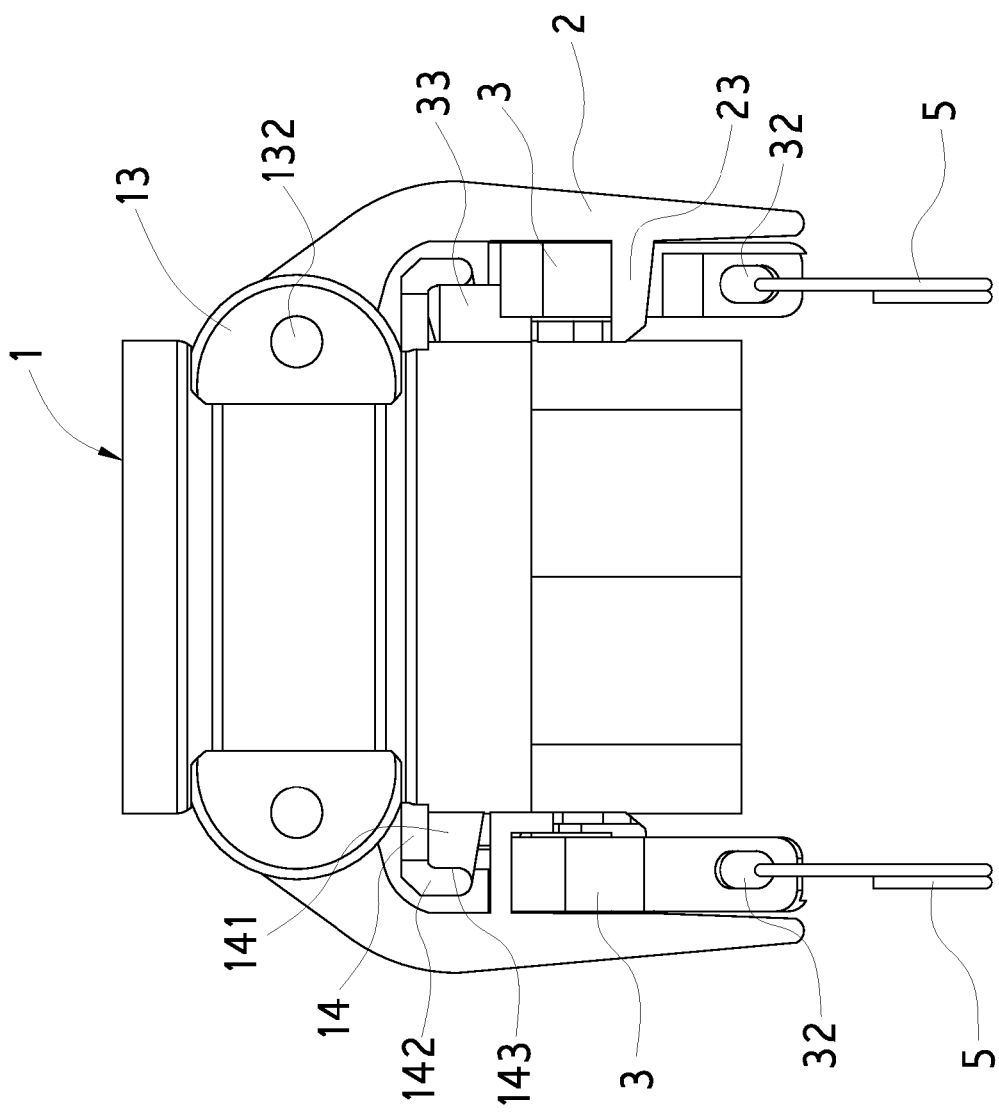
FIG. 3 illustrates a schematic lateral structure of the tubular connection structure of the present invention.

With references to FIG. 1 to FIG. 3, which illustrate a schematic 3-D exploded view of the tubular connection structure of the present invention, a schematic 3-D assembled view of the tubular connection structure of the present invention and a schematic lateral structure of the tubular connection structure of the present invention. The structure includes:
a tubular connection body 1, which has a tubular room 11, two tubes are inserted into the tubular room 11 in order to approach the function of fixing, the tubular connection body 1 may provide the tubes with different dimensions for connecting each other, each of the two sides of the tubular room 11 has an open slot 12, the two sides of the open slot 12 are respectively extended from the external rim of the tubular connection body 1 to form two pivotal bases 13 that are corresponding to each other, a room 131 is between the two pivotal bases 13, each of the two pivotal bases 13 has a pivotal hole 132, the position around the bottom of the open slot 12 and the outer rim of the tubular connection body 1 is extended to form a fastening base 14, a lateral view of the fastening base 14 is about the shape of reverse "L" so as to form a stop room 141, a guiding surface 142 is at the one side of the stop room 141 and a bevel, hence a stirring lever 3 is guided into the stop room 141 of the fastening base 14, the inner rim of the stop room 141 is formed a stop portion 143 in order to block a stop convex portion 33 of a stirring lever 3;

a clasp lever 2, the side view of the clasp lever 2 is about the shape of "<", the one end of the clasp lever 2 is a pressing portion 21, the other end of the clasp lever 2 is a stirring portion 22, the clasp lever 2 has a through hole 211, the stirring portion 22 has a stirring lever accommodating base 23 at a position of the stirring portion 22 toward the tubular connection structure 1, each of the stirring lever accommodating base 23 and the stirring portion 22 of the clasp lever 2 has a pivotal hole 231, therefore, the stirring lever 3 can be accommodated and pivotally connected to;

the stirring lever 3, which is accommodated in the stirring lever accommodating base 23 of the clasp lever 2, a through hole 31 of the stirring lever 3 is corresponding to the pivotal hole 231 of the stirring lever accommodating base 23 and at the one end of the stirring lever 3, the other end of the stirring lever 3 has a hole 32 for accommodating a ring 5, the top of the stirring lever 3 being a stop convex portion 33 that is to fasten the fastening base 14 of the tubular connection body 1 and has a positioning surface 34 in line with the guiding surface 142 of the fastening base 14 of the tubular connection body 1;

a reset component 4, the one end of the reset component 4 is urged to the stirring lever 3, the other end is urged to the clasp lever 2, so that a flexible resistant force is between the stirring lever 3 and the clasp lever 2;

the ring 5, which is made of a metal wire and inserted through the hole 32 of the stirring lever 3 for a user stirring the stirring lever 3;

at least two fixing members 6, each fixing member 6 has a screw thread 61 at one end; the clasp lever 2 is pivotally connected to the pivotal base 13 of the tubular connection body 1 with the first fixing member 6, wherein the first fixing member 6 is disposed in the pivotal hole 132 and the pivotal hole 211, and the stirring lever 3 is pivotally connected to the stirring lever accommodating base 23 of the clasp lever 2 with the second fixing member 6, wherein the second fixing member 6 is disposed in the pivotal hole 31 and the pivotal hole 231.

While the assembly of the present invention is done, the clasp lever 2 is pivotally connected to the pivotal base 13 via the fixing member 6 going through the pivotal hole 132 and the through hole 211 of the clasp lever 2, the clasp lever 2 can then swing at the pivotal base 13; the stirring lever 3 is pivotally connected to the clasp lever 2 as well by means of the other fixing member 6 going through the pivotal hole 231 of the stirring lever accommodating base 23 and the through hole 31 of the stirring lever 3, thus the stirring lever 3 is able to swing at the clasp lever 2, additionally the flexible resistant force is between the stirring lever 3 and the clasp lever 2 through the reset component 4. While the clasp lever 2 moves toward the tubular connection body 1, the positioning surface 34 of the stirring lever 3 contacts the guiding surface 142 of the fastening base 14, the stop convex portion 33 may be easily slid into the stop room 141 of the fastening base 14. By means of the stop convex portion 33 and the stop portion 143 of the fastening base 14, the clasp lever 2 may not be loosened up. In the mean time, the pressing portion 21 of the clasp lever 2 is pressed toward the tubular room 11 for fastening the tubes.

Figure 4:
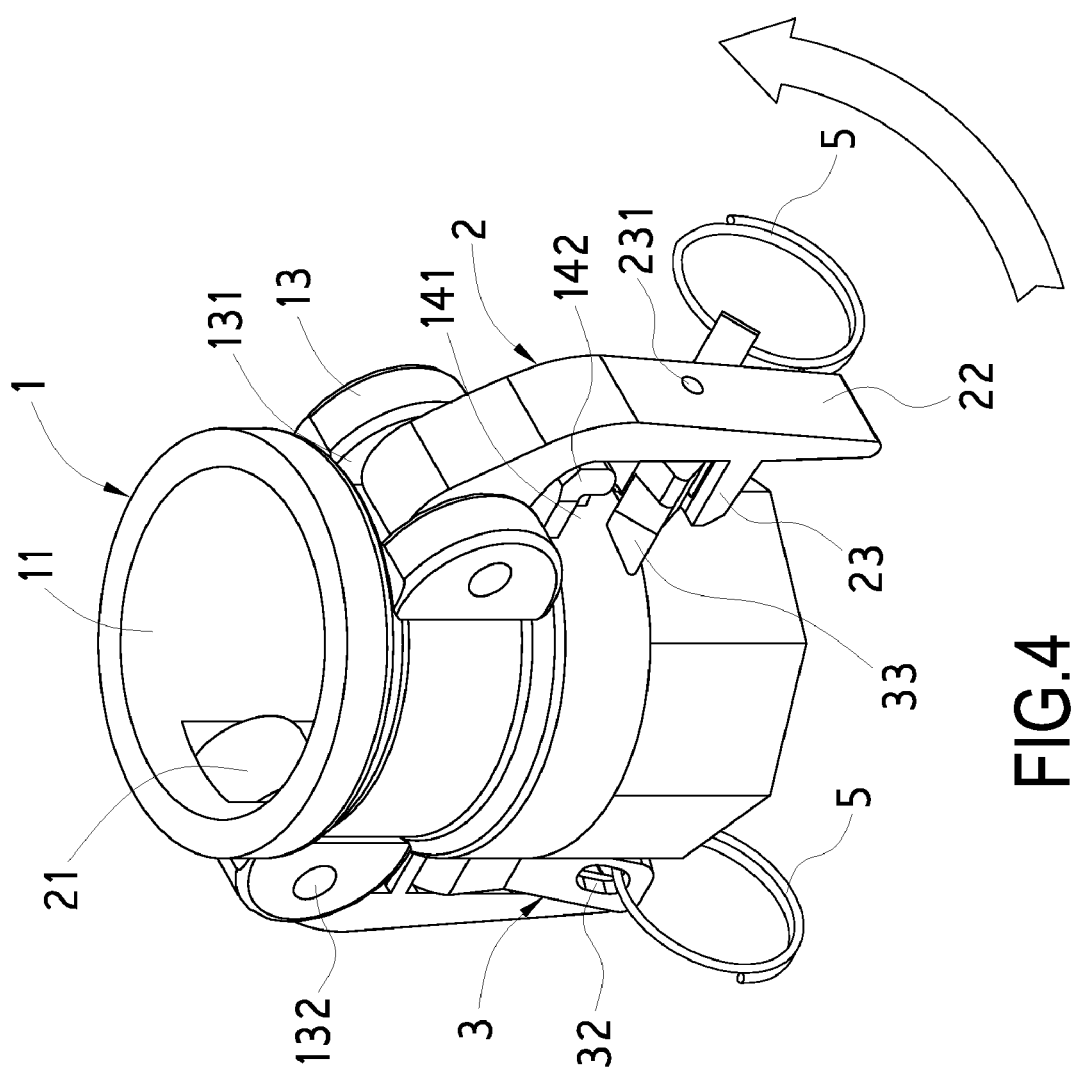
FIG. 4 illustrates a schematic view of a first action of the tubular connection structure of the present invention.
Figure 5:
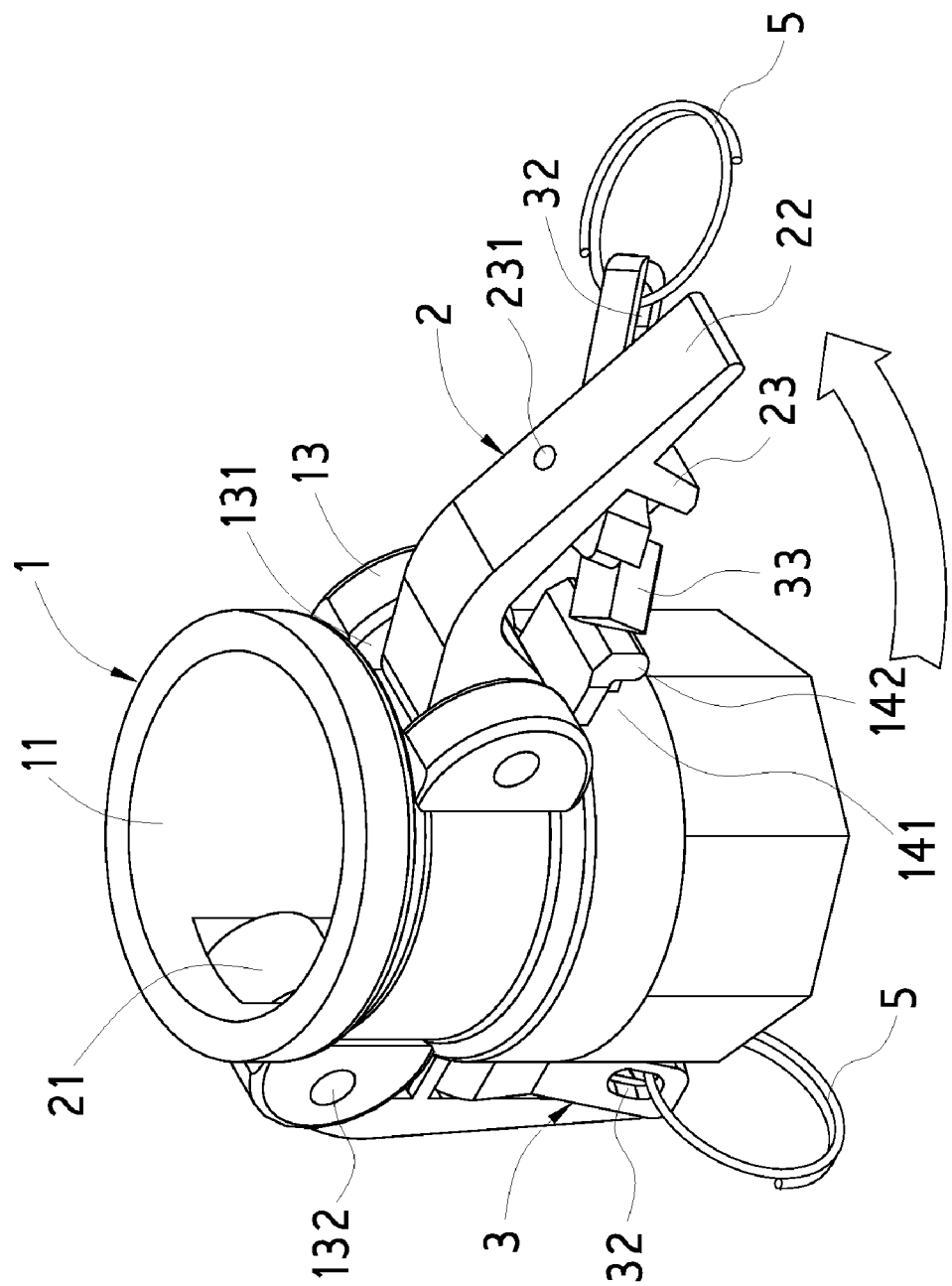
FIG. 5 illustrates a schematic view of a second action of the tubular connection structure of the present invention.
Figure 6:
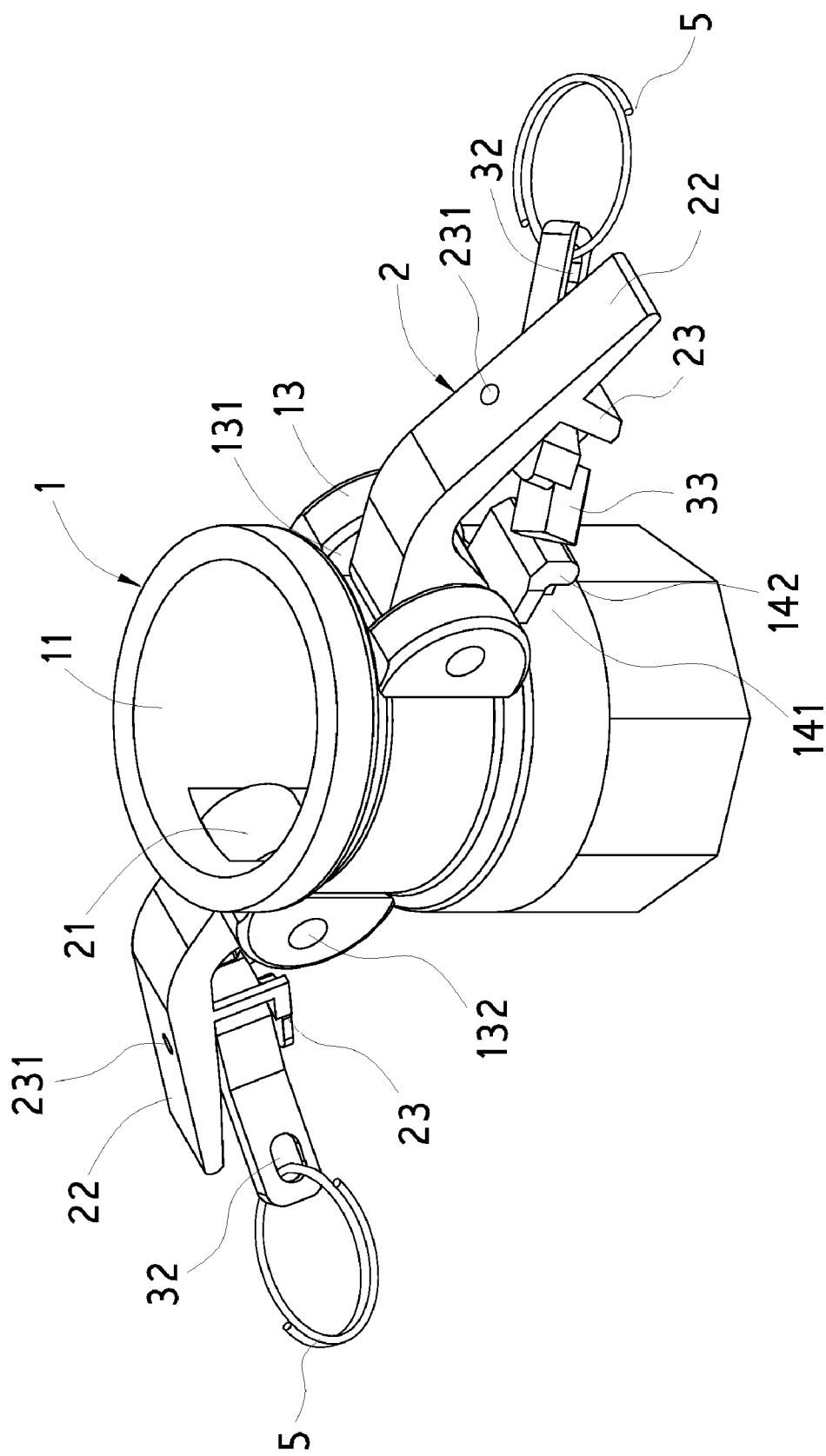
FIG. 6 illustrates a schematic view of finishing the actions of the tubular connection structure of the present invention.

With references to FIG. 4 to FIG. 6, which illustrate a schematic view of a first action of the tubular connection structure of the present invention, a schematic view of a second action of the tubular connection structure of the present invention and a schematic view of finishing the actions of the tubular connection structure of the present invention.

From the three views, which present how the user loosens up the clasp lever 2. That is, applying a force to the ring 5 to rotate the stirring lever 3 in an angle with that the through hole 31 is the rotation center makes the stop convex portion 33 to take off from the stop room 141. Continuously, applying a force to the ring 5 to rotate the stirring lever 3 in another angle with that the through hole 31 is the rotation center makes the bottom of the clasp lever 2 to be going up so as to drive the pressing portion 21 to not fasten the tubes. Hence, the purpose of easy loosen up is achieved. Further, the user can only stir the stirring lever to take off the clasp lever from the tubular connection body without the ring.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. A tubular connection structure comprising:
   a tubular connection body, having a tubular space, two open slots being positioned in the tubular space;
   the two open slots being respectively extended to form two pivotal bases;
   a bottom of the tubular connection body being extended to form a fastening base;
   a clasp lever, being pivotally connected to the two pivotal bases of the tubular connection body;
   one end of the clasp lever being a pressing portion, the other end of the clasp lever being a stirring portion that has a stirring lever accommodating base;
   a stirring lever, being accommodated in the stirring lever accommodating base;
   a top of the stirring lever being a stop convex portion that is to fasten the fastening base of the tubular connection body;
   a reset component, one end of the reset component being urged towards the stirring lever, the other end being urged towards the clasp lever, so that a flexible resistant force is between the stirring lever and the clasp lever; and
   at least two fixing members, each fixing member having a screw thread at one end, the clasp lever pivotally connected to the pivotal base of the tubular connection body with a first fixing member, and the stirring lever pivotally connected to the stirring lever accommodating base of the clasp lever with a second fixing member.

2. The tubular connection structure according to claim 1, wherein the two pivotal bases are corresponding to each other, and the two pivotal bases having a clearance therebetween for accommodating the clasp lever.

3. The tubular connection structure according to claim 1, wherein the fastening base has a stop room for accommodating the stop convex portion, a guiding surface being at the one side of the stop room, the stop convex portion of the stirring lever having a positioning surface in line with the guiding surface, the stirring lever being guided into the stop room of the fastening base in accordance with the positioning surface.

4. The tubular connection structure according to claim 1, wherein the stirring lever has a hole for accommodating a ring, the ring being applied to the stirring lever.

5. The tubular connection structure according to claim 1, wherein each of the two pivotal bases has a pivotal hole, the clasp lever having a through hole in accordance with the pivotal holes, so that the fixing member is pivotally connected to the two pivotal bases through the pivotal holes and the through hole.

6. The tubular connection structure according to claim 5, wherein the one end of the fixing member has a screw head, the fixing member is fastened in one of the pivotal holes via the screw head.

7. The tubular connection structure according to claim 6, wherein the stirring lever accommodating base of the clasp lever has a pivotal hole, a through hole of the stirring lever being corresponding to the pivotal hole, so that the stirring lever is pivotally connected to the stirring lever accommodating base via another fixing member going through the pivotal hole and the through hole.

8. The tubular connection structure according to claim 1, wherein the side view of the clasp lever is about the shape of "<".

9. The tubular connection structure according to claim 1, wherein the reset component is a spring.

* * * * *